(12) United States Patent
Joshi et al.

(10) Patent No.: US 7,993,111 B2
(45) Date of Patent: Aug. 9, 2011

(54) POWER STEERING PUMP FLOW CONTROL

(75) Inventors: Samir Joshi, Rochester Hills, MI (US); Leonard F. Bishop, Sterling Heights, MI (US); Douglas C. Myers, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 889 days.

(21) Appl. No.: 11/968,821

(22) Filed: Jan. 3, 2008

(65) Prior Publication Data
US 2009/0175734 A1 Jul. 9, 2009

(51) Int. Cl.
*F04B 49/00* (2006.01)
*F16D 31/02* (2006.01)
*F15B 11/08* (2006.01)

(52) U.S. Cl. .......... 417/300; 417/53; 417/302; 417/441; 60/468; 91/446

(58) Field of Classification Search ........... 417/300, 417/302, 307; 137/119.09, 468; 60/468; 91/446, 375
See application file for complete search history.

(56) References Cited

U.S. PATENT DOCUMENTS

| | | | | |
|---|---|---|---|---|
| 4,446,697 | A | * | 5/1984 | Goscenski, Jr. ............. 60/443 |
| 4,549,566 | A | * | 10/1985 | Fujiwara et al. ......... 137/115.09 |
| 5,161,959 | A | | 11/1992 | Gettel |
| 7,556,479 | B2 | * | 7/2009 | Foor .............................. 417/307 |
| 2009/0053077 | A1 | * | 2/2009 | Arnett et al. ................. 417/302 |

OTHER PUBLICATIONS

Bishop, et al., "Power Steering Pump with Enhanced Cold Start Priming", SAE 2001-01-1422, Society of Automotive Engineers, 2001.

* cited by examiner

*Primary Examiner* — Charles G Freay

(57) ABSTRACT

An apparatus for preventing noise from occurring due to cavitation in a power steering pump during low temperature start-up includes the addition of a multi-passage orifice element for adding wetted surface resistance to high viscous fluid flow downstream from a single passage outlet orifice element of a fluid flow control device and upstream of an associated steering gear or steering assist valve.

11 Claims, 2 Drawing Sheets

POWER STEERING PUMP FLOW CONTROL

BACKGROUND

1. Field of the Invention

This invention relates to the field of controlling the fluid flow rate for hydraulic pumps, especially for automotive power steering pumps, and more specifically to the area of eliminating cavitation that results from pumping high viscosity fluid at extremely low temperatures.

2. Description of the Prior Art

At very low temperatures extending to near −40° F., the viscosity or resistance to flow of fluid used in automotive power steering systems increases by about 8000 times as compared to its viscosity at 275° F. At such low temperatures, the fluid flows like thick, heavy syrup.

Conventionally, power steering systems have a reservoir located remotely, or at least separate, from the hydraulic pump that pressurizes the system. The reservoir is usually placed in a relatively uncongested region of the engine compartment in comparison to the region surrounding the pump and drive belt sheave, by which the pump is driven from an engine. A pressure drop of 5-7 psi normally occurs at very low temperatures in a tube connecting the reservoir to the pump inlet. Another pressure drop of about the same magnitude is present within the pump between its inlet and the pumping chamber. These pressure drops result in an extremely low pressure, about 1 psi. in the supply chamber at very low temperatures.

When the engine is started in severely cold weather conditions, the pump speed immediately rises. However at such temperatures, the viscosity of the fluid is too high to permit sufficient flow of fluid from the reservoir to enter and fill the pumping chamber. This lack of fluid in the chamber cavitates the pump. It also causes an offensive high frequency noise that typically lasts for several seconds as fluid pressure in the steering assist valve supplied from the pump cycles rapidly between zero pressure to approximately 100 psi when some fluid does enter the supply chamber. The cyclic nature of the pressure variation is a consequence of successive short periods of sluggish flow through the pump, when a pumping chamber is at least partially filled with fluid, alternated by a short period when the pumping chambers are substantially fully vacant.

The resultant noise is objectionable and evidences a brief period during which the system or load is only partially pressurized. As flow rate increases following the cold start, fluid temperature rises rapidly to a temperature where pump cavitation ceases, the system becomes fully pressurized, noise disappears, and all other functions are normal.

To overcome the cold start difficulties, it is conventional practice to increase the size of hoses connecting the reservoir to the pump inlet and the pump to the steering assist valve in order to enhance flow. Such hoses add costs and require more space in an already crowded environment. Alternatively, one may use a hydraulic fluid, having a viscosity which increases only about 4000 times between 275° F. and −40° F. However, there is a substantial increase in cost over fluid having the usual viscosity properties over the same temperature range. Another remedy involves designing a single passage outlet orifice of a hydro-mechanical flow control device so that it provides higher shear forces to the highly viscous fluid. However, other tradeoffs must be made to the overall operation of the system during normal operating temperatures.

U.S. Pat. No. 5,161,959 proposes various solutions to the problem of cold start noise, including substituting an outlet orifice element having multiple small passages for an outlet orifice element having a single larger passage that is located between the pump outlet of a hydraulic flow control valve and its bypass port. The total wetted surface area of the sidewalls of the multiple small passages is substantially greater than that of the single larger passage. However, by maintaining the same total cross sectional area in the multiple passages as the cross-sectional area of the single larger passage, the pressure drop across the multiple small passages is said to be kept the same as that of the larger passage of the substituted single passage outlet orifice element.

SUMMARY OF THE INVENTION

The flow control system of the present invention includes the addition of a multiple passage orifice element downstream from a single passage outlet orifice element that is located in a hydraulic flow control valve. The hydraulic flow control valve is located to be in communication with the output of a fixed displacement pump and provides fluid pressure regulation to the power steering assist valve. The flow control valve includes a pressure differential sensitive spool valve that controls the amount of fluid from the pump that is delivered to the steering assist valve through a pump outlet port. The spool valve resides in a bore that defines a control chamber on one end and a pump chamber at the other end. The supply chamber is a variable volume defined by a portion of the bore between one face of the spool valve and an opposing single passage outlet orifice element. The supply chamber also includes a supply port in communication with the output of the engine driven pump and a by-pass port. The single passage outlet orifice element provides fluid communication between the supply chamber and the pump outlet port. The flow control valve also includes a feedback passage that communicates pressure between the pump outlet port and the control chamber to provide the differential pressure by which the spool valve is positioned in the bore. The position of the spool valve proportions the amount of fluid that is allowed to be supplied from the output of the pump through the single passage outlet orifice element to the steering assist valve, versus that which is diverted or by-passed back to the input of the pump or to its reservoir. The bypass port opens as the valve spool moves due to the differential pressure existing between the supply chamber and the control chamber, across the spool valve. When pump discharge is low or the steering valve demand is high, the spring biased spool valve closes the bypass port. When pump flow rate increases or the steering valve demand is low, the pressure in the supply chamber is sufficiently higher than that in the control chamber to overcome the spring bias and cause the spool valve to open the by-pass port. A single passage outlet orifice element located between the by-pass port and the pump outlet port provides fluid pressure regulation of fluid flowing from the pump discharge to the steering assist valve during normal operations. To combat the occurrence of cold start noise, a multiple passage orifice element is provided downstream of the single passage outlet orifice element. The addition of the multiple passage orifice element provides enhanced resistance to high viscosity fluid flow at very low temperatures and prevents the pulsation effects of pump cavitation that would otherwise result in objectionable noise.

One embodiment of the invention includes locating the multiple passage orifice element downstream of the single passage outlet orifice element within the flow control valve and prior to its pump outlet port.

Another embodiment of the invention includes locating the multiple passage orifice element downstream of the single passage outlet orifice external to the flow control valve and prior to the power steering assist valve.

Both embodiments include the use of a multiple passage orifice element in which the total wetted surface area of the multiple passages is substantially greater than the wetted surface area of the single passage of the single passage outlet orifice element.

Both embodiments include the use of a multiple passage orifice element in which the total cross-sectional area of the multiple passages is substantially equal to the cross-sectional area of the single passage of the single passage outlet orifice element.

These embodiments create a larger resistance to the highly viscous fluid from the engine driven pump and thereby eliminate pulsation of the fluid caused by pump cavitation at very low temperatures in the range of from approximately −40° F. to 5° F. The greater amount of wetted surfaces, provided by the multiple passage orifice element in line with the single passage outlet orifice element, together cause significant drag on the flow of high viscous fluid. At relatively low viscosity during normal operating conditions, the effect of the greater amount of wetted surface area is substantially less than when viscosity is high.

Therefore, it is an object of the present invention to provide significant shear force resistance to fluid flow in a power steering system during start up periods when the temperature of the hydraulic fluid is significantly low enough to cause an increase in viscosity and to prevent noise caused by cavitation in the engine driven pump.

It is another object of the present invention to provide a multiple passage orifice element in a hydraulic power steering downstream from and in addition to a single passage outlet orifice element to prevent noise from being generated in the power steering system during extremely cold start up.

It is a further object of the present invention to provide a multiple passage orifice element in a hydraulic power steering downstream from and in addition to a single passage outlet orifice element to provide shear force resistance that causes highly viscous power steering fluid to become heated when flowing at extremely low temperatures.

DETAILED DESCRIPTION

Figure 1:
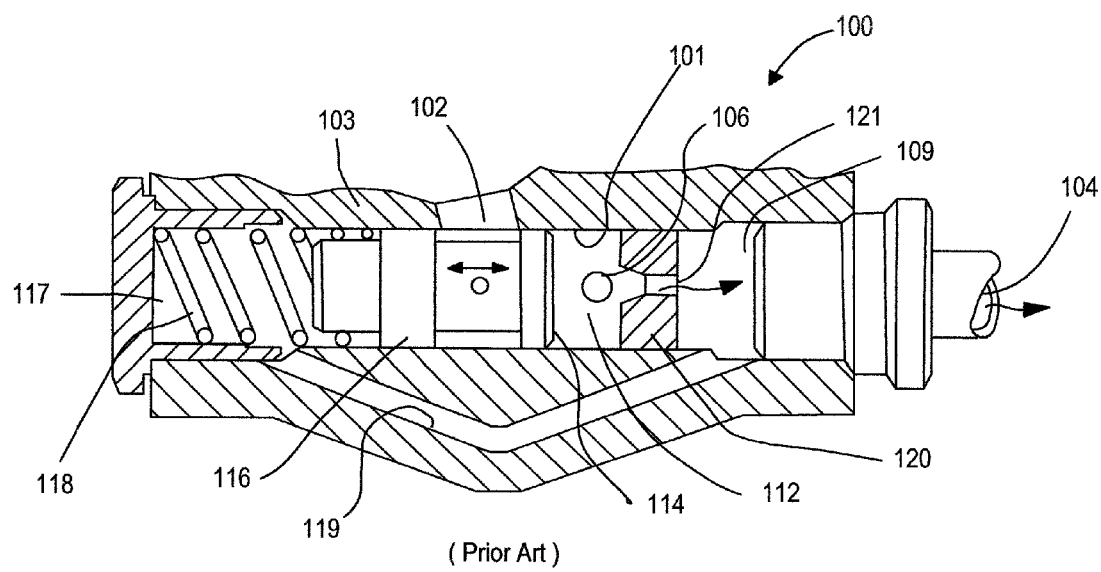
FIG. 1 is a cross-section through a prior art power steering flow control valve with a single passage outlet orifice element.
Figure 2:
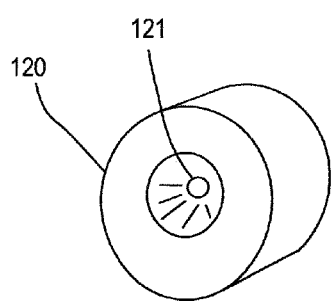
FIG. 2 is a perspective plan view of a typical single passage outlet orifice element.
Figure 5:
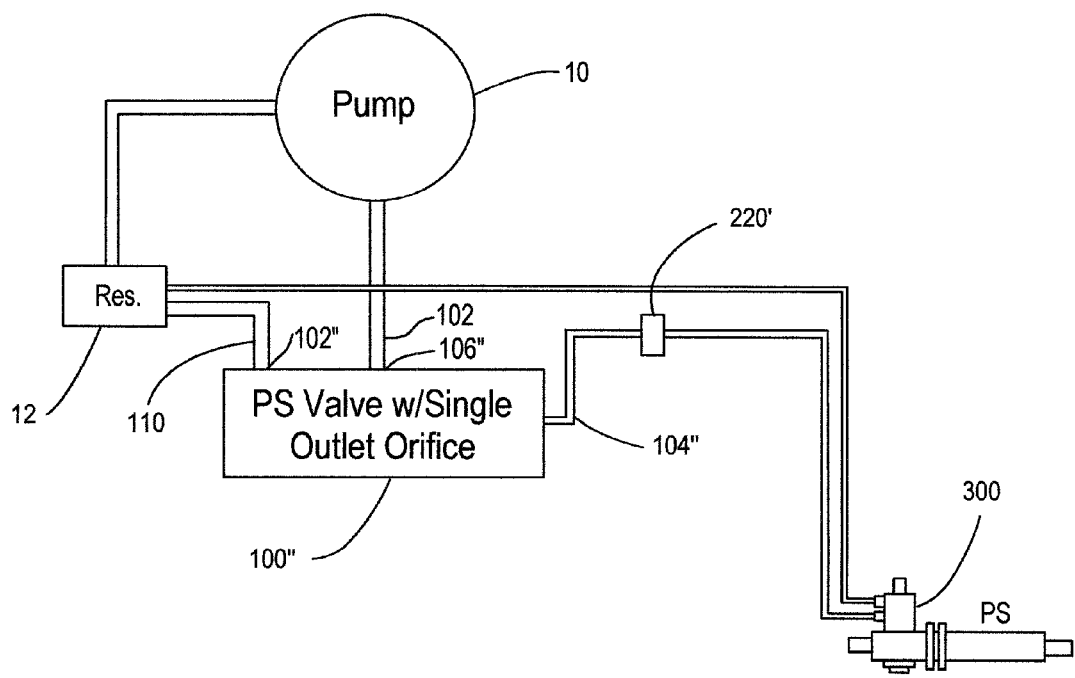
FIG. 5 is schematic drawing of a typical power steering system incorporating another embodiment of the present invention.

A prior art hydro-mechanical flow control device 100 is shown in FIG. 1 and is typical of the types of flow control devices normally employed in hydraulic assist power steering systems. Although typical, it is but one of many variations of flow control devices that are known in the art. It is shown here to represent an environment for the present invention which is described below. Flow control device body 103 is formed with a central bore 101 that contains a spool valve 116 that is movable among various linear positions within bore 101. A control side chamber 117 is defined at one end of bore 101 adjacent spool valve 116. A biasing spring 118 is seated between the closed end of chamber 117 and the control side of spool valve 116 (shown here as being on the left side of spool 116). A supply side chamber 112 is defined at the opposite end of spool 116 and contains an outlet orifice element 120. Outlet orifice element 120 has a single restrictive passage 121 that is shown in FIG. 2. A bypass port 102 is formed as a side opening in bore 101 located adjacent a leading edge face 114 of spool 116 and is in direct communication with the low pressure side of an engine driven power steering pump 10, usually via its associated reservoir 12 which provides the supply of power steering hydraulic fluid (as shown in FIG. 5). A supply port 106 is formed as a side opening in bore 101 and is always open to provide direct communication with the discharge output of pump 10. An outlet passage 109 is provided in bore 101 downstream of the outlet orifice element 120 to provide an coupling for a hose 104 that leads to the power steering assist valve 300. A feedback passage 119 is provided in body 103 to provide communication of pressure that exists at the outlet passage 109 to the control side chamber 117.

Initially, when the engine is first started, spool 116 is located in a position where it is biased to close by-pass port 102, as shown in FIG. 1. As the engine driven pump 10 delivers hydraulic fluid into supply chamber 112 from supply port 106, the pressure in the supply chamber increases to a level where spool 116 is moved towards the control chamber against biasing spring 118. Depending on the amount of pressure drop provided by fluid escaping through passage 121 of outlet orifice element 120 to and the amount of resistance in the power steering assist valve, the differential in pressure across spool 116 may be sufficient to overcome the bias and cause leading edge face 114 to open by-pass port 102 and allow diversion of fluid to the low pressure side of pump 10.

As stated above, the present invention is intended to substantially reduce or eliminate noise that is generated in conventional hydraulic power steering systems during start up in very cold weather conditions. The present invention achieves that intention by adding only a single element to a conventional hydro-mechanical flow control device that functions to eliminate the noise and to not otherwise interfere with normal operations when the fluid reaches temperatures that are considered in the normal range and which do not normally result in noise problems.

A conventional single passage outlet orifice element such as represented as 120, is designed to create a predetermined pressure drop between supply side chamber 112 and outlet passage 109. However, it has been found that during start up when the fluid temperatures are at levels of around −40° F., cavitation occurs in the pump due the extremely high viscosity of the fluid at those temperatures. There is a necessity to increase the resistance to fluid flow from the outlet of the pump during these very low temperatures to prevent the vanes of the pump from creating voids due to drawing the high viscosity fluid into the pumping chamber and the resultant cavitation that occurs which produces pulsation and the unwanted noise.

Figure 3:
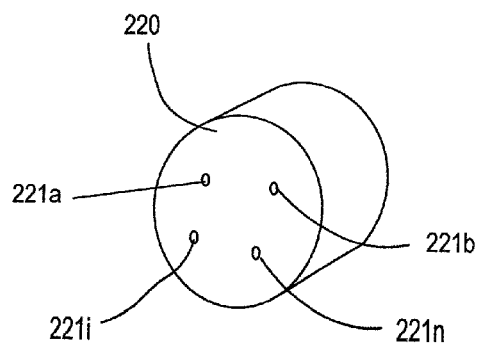
FIG. 3 is a perspective plan view of a multiple passage outlet orifice as used in the present invention.

An embodiment of multiple passage orifice element 220 is represented in FIG. 3 as a cylinder. Element 220 contains a plurality of elongated passages 221a-221n that extend along the length of the cylinder and are oriented parallel to each other and to the flow of fluid there-through The relationship of the several passages 221a-221n to the single passage 121 in outlet orifice element 120 is such that the sum of the areas of the cross-sections of the several passages, when measured on a plane that is taken perpendicular to the direction of fluid flow through the passages, is at least equal to the cross-sectional area of the single passage 121. This relationship is provided so that the multiple passage orifice element 220 will add the desired wetted surface resistance to fluid flow when the fluid is in its high viscosity condition at the very low temperatures, but not interfere or influence the fluid flow and pressure supplied to the steering assist valve during normal operating temperatures. Because there is a plurality of passages, the sidewalls of the passages 221a-221n add the desired wetted surface resistance to fluid flow when the fluid is in its high viscosity condition at the very low temperatures. This has the effect of increasing shear forces on the highly viscous fluid to provide increased backpressure to the pump during the very cold conditions.

The increased side wall surface area presented by this additional orifice element with a plurality of passages having a total cross-sectional area at least equal to that of the single passage 121 of orifice element 120 is achieved because the total of the perimeter measurements of the plurality of passages becomes higher with the number of passages. And an increased wetted surface area on the passage walls add shear forces (resistance) to high viscosity fluid flow which in turn causes heat to be generated in the fluid.

Figure 4:
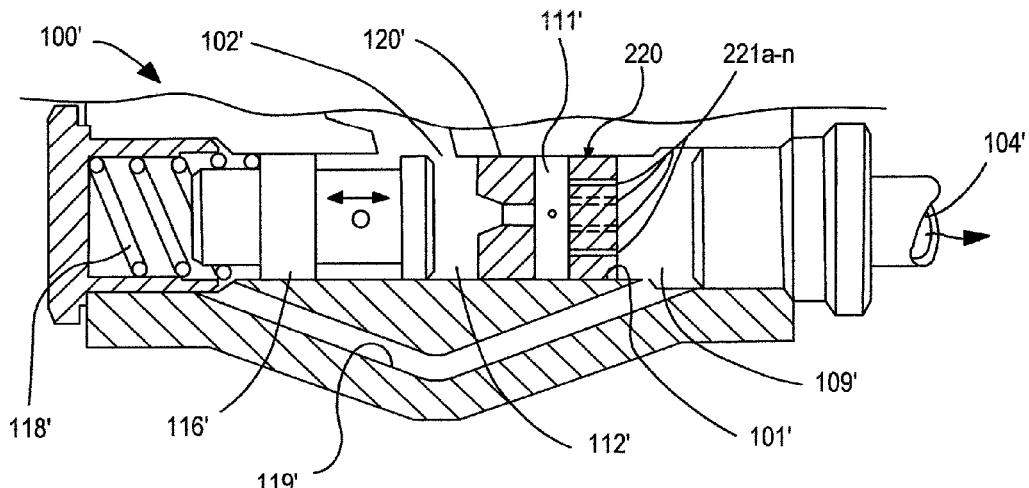
FIG. 4 is a cross-section through a power steering flow control valve embodying the present invention.

In FIG. 4, a first embodiment of the invention is shown in which the multiple passage orifice element 220 is placed downstream of a single passage outlet orifice element 120' in the bore 101' of a hydro-mechanical flow control device 100'. Multiple passage orifice element 220 is separated by a space 111' from single passage outlet orifice element 120' and prior to the opening to the feedback passage 119'. Multiple passage orifice element 220 is tight fitted in bore 101' to require that all fluid flowing into outlet passage 109' passes through the passages 221a-221n. The two orifice elements 120' and 220, in series, act to provide the increased shear forces to high viscosity fluid flow at very low temperatures. During normal operation when the fluid is at its working temperatures, the multiple passage orifice element 220 does not interfere with the pressure control function of the single orifice element 120'.

In FIG. 5, a second embodiment of the present invention is shown. The engine driven pump 10 has its low pressure input 13 connected to a reservoir 12 and its high pressure output 107 connected to a hydro-mechanical flow control device 100" (also referred to as a "power steering valve"). The bypass port 102" is connected to reservoir 12 via a hose 110. In this embodiment, the multiple passage orifice element 220' is placed downstream of a single passage outlet orifice element of hydro-mechanical flow control device 100". Here, the multiple passage orifice element 220' is located in the outlet hose that leads from the hydro-mechanical flow control device 100" to the steering assist valve 300.

The second embodiment illustrates how the present invention allows one the flexibility of locating the multiple passage orifice element anywhere downstream of the single passage outlet orifice element of a hydro-mechanical flow control device and before the power steering assist valve, while achieving the objects of the invention stated above.

We claim:

1. Apparatus for enhancing the low temperature start-up of a power steering pump that includes:
    a pump for pumping hydraulic steering fluid through a single passage outlet orifice restricting element to a steering assist valve;
    a fluid flow control device connected to the output of said pump;
    said flow control device having a first supply side defined for receiving fluid under pressure from said pump output prior to said outlet orifice, a second supply side defined for receiving fluid under pressure from said pump output after said outlet orifice and before said steering assist valve, a bypass port connected to a fluid line that is in communication with an input fluid supply of said pump; a spool element within said flow control device being adjustable between said first supply side and said second supply side to control the amount of diversion of a portion of said fluid from said pump output to said bypass port; a biasing element within said flow control device to provide a predetermined biasing to said spool element; and
    a second flow restriction element disposed in a fluid passage downstream from said outlet orifice restricting element for increasing flow resistance of fluid in said fluid passage at low temperatures, said second flow restriction element having a plurality of fluid passages with a total wetted surface sidewall area that exceeds the wetted sidewall area of said single passage of said outlet orifice restricting element.

2. An apparatus as in claim 1, wherein said plurality of fluid passages in said second flow restriction element have a total cross-sectional area at least equal to the cross-sectional area of the single passage in said outlet orifice restricting element, as measured in planes that are perpendicular to fluid flow.

3. An apparatus as in claim 2, wherein said outlet orifice restricting element has a single orifice passage that is larger than any of the plurality of fluid passages in said second flow restriction device.

4. An apparatus as in claim 1, wherein said second flow restriction device is disposed within said fluid flow control device.

5. An apparatus as in claim 1, wherein said second flow restriction device is disposed between said fluid flow control device and said steering assist valve.

6. An apparatus as in claim 1, wherein said second flow restriction device comprises a generally cylindrical member defining a plurality of elongate passages oriented parallel to each other and to the flow of fluid there-through.

7. A method of reducing pressure pulsation in a power steering pump during cold start of an associated engine which drives said pump, comprising the steps of:
    providing a fluid flow control device in communication with a discharge side and an intake side of said pump to regulate the pressure of fluid output to a steering assist valve;
    providing an outlet orifice element in said fluid flow control device to establish a pressure differential between the discharge side of said pump and the outlet of said fluid flow control device;
    conveying fluid from the outlet of said fluid flow control device to a fluid passage and said steering assist valve; and
    providing a second flow restriction orifice element in said fluid passage downstream from said outlet orifice element, wherein said second flow restriction orifice element is formed to contain a plurality of passages which act to provide increased resistance to fluid flow in said fluid passage at low temperatures.

8. A method as in claim 7, wherein said step of providing an outlet orifice element includes providing said outlet orifice element with a single fluid passage orifice.

9. A method as in claim 8, wherein said step of providing a second flow restriction orifice element includes providing said second flow restriction orifice element with a plurality of fluid passage orifices that present a total of wetted surface sidewall area that exceeds the wetted sidewall area of said outlet orifice element.

10. A method as in claim 9, wherein said step of providing a second flow restriction orifice element includes locating said second flow restriction orifice element within said fluid flow control device.

11. A method as in claim 9, wherein said step of providing a second flow restriction orifice element includes locating said second flow restriction orifice element external to said fluid flow control device.

* * * * *